Inventor
Edward W. Berriman,
by
Jacobi & Jacobi
Attorneys

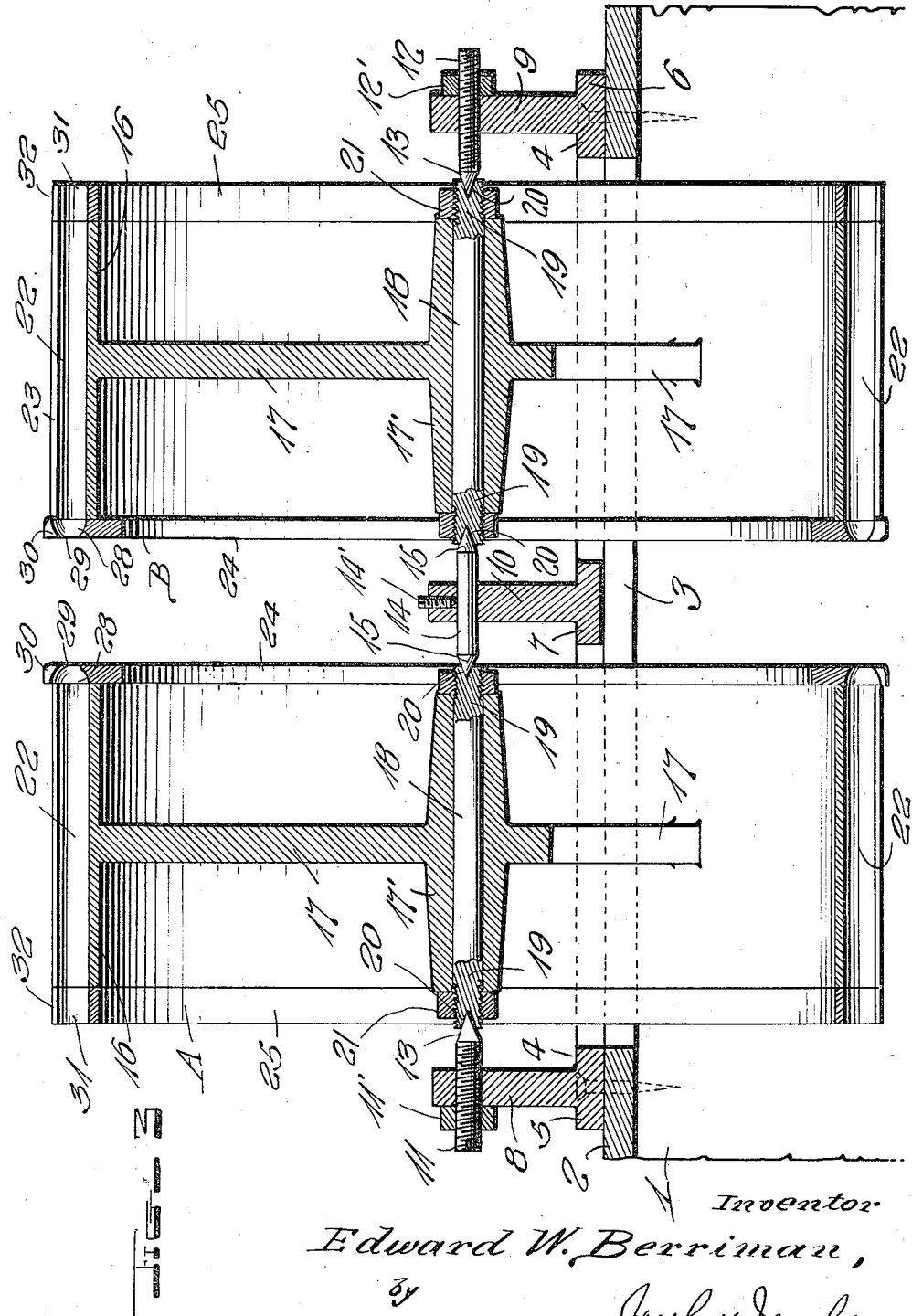

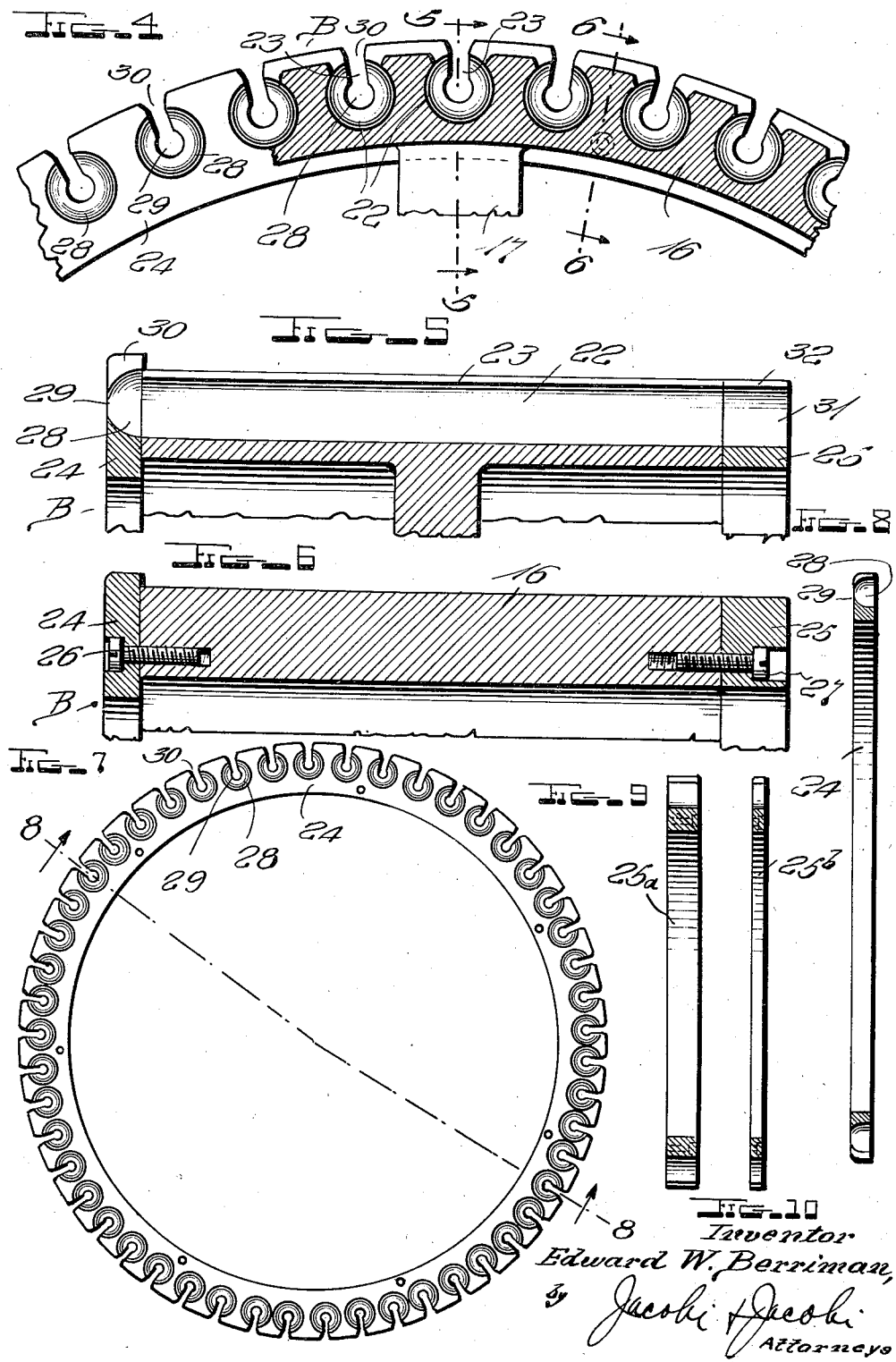

Patented June 23, 1942

2,287,083

UNITED STATES PATENT OFFICE 2,287,083

MOLD FOR USE IN MANUFACTURING CIGARS

Edward Wood Berriman, Tampa, Fla.

Application September 11, 1939, Serial No. 294,373

1 Claim. (Cl. 131—87)

This invention relates to an apparatus for use in molding cigar bunches or fillers to give them a desired form or shape preparatory to the application of the wrappers thereto. More particularly the invention relates to a rotary drum type of continuous molding apparatus wherein the periphery of the drum is provided with an annular series of mold cavities or channels which are successively brought, by a step by step rotation of the drum, into position to be charged with bunches to be shaped therein and thereafter brought into position for the extraction of the shaped bunches and application of the wrappers.

One object of the invention is to provide an apparatus of this type which adapts the cigar body and tuck end to be shaped as desired in a single molding action so as to avoid the necessity of shaping the body and tuck end by separate and independent operations.

Another object of the invention is to provide an apparatus of this type wherein the forming and setting operations are automatically performed without mechanically pressing the bunches and without the necessity of using and successively manipulating independent molds or pressing devices for shaping the body and tuck end and properly setting the bunch preparatory to application of the wrapper.

Still another object of the invention is to provide an apparatus of this type which facilitates and reduces the time period and amount of labor involved in charging the molds, shaping the bodies and tuck ends of the bunches and effecting the extraction of the shaped bunches from the molds.

Still another object of the invention is to provide an apparatus of this type whereby bunches for cigars of different lengths and with tuck ends of different shapes may be produced.

Still another object of the invention is to generally simplify the construction and increase the efficiency of molding apparatus of this character.

With these and other objects in view, the invention consists of the novel features of construction, combination and arrangement of parts, hereinafter fully described and claimed, reference being had to the accompanying drawings, in which:

Fig. 3 is a vertical transverse section on the line 3—3 of Fig. 1.

Fig. 4 is a fragmentary vertical longitudinal section on an enlarged scale taken through the rim of one of the drums and showing a portion of the associated tuck forming ring in inner side elevation.

Fig. 5 is a vertical transverse section through the rim of one of the drums taken on line 5—5 of Fig. 4 along one of the mold channels.

Fig. 6 is a section on line 6—6 of Fig. 4.

Fig. 7 is an inner face view of a tuck forming ring.

Fig. 8 is a section through the tuck forming ring on line 8—8 of Fig. 7.

Figs. 9 and 10 are similar views of two outer changeable flag and extension rings which may be employed to form bunches or fillers of different lengths.

Figure 1:
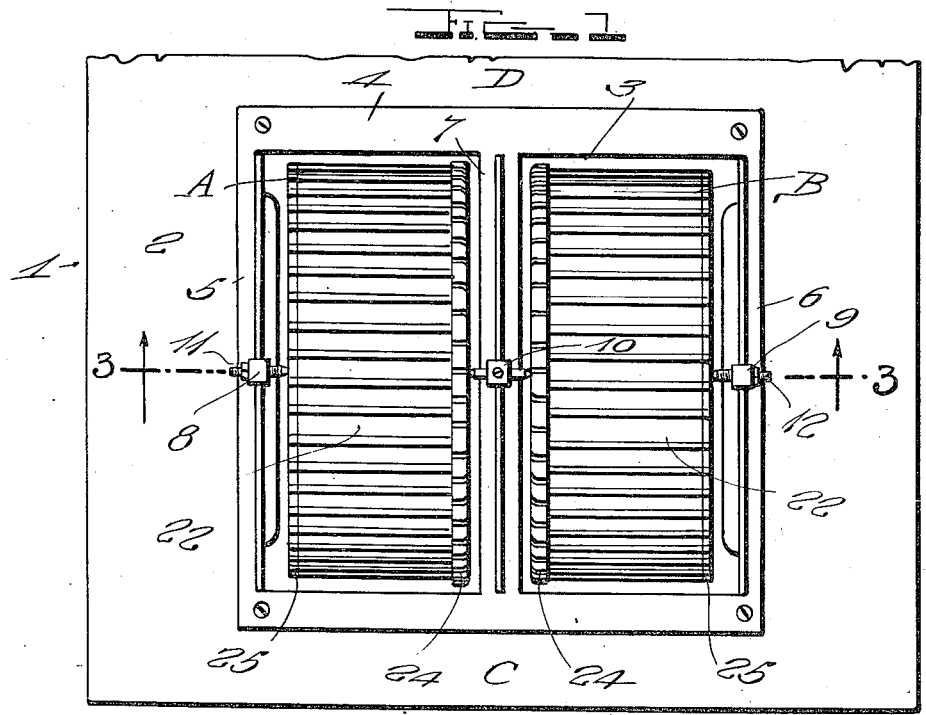
Fig. 1 is a top plan view of a cigar bunch molding apparatus embodying my invention.
Figure 2:
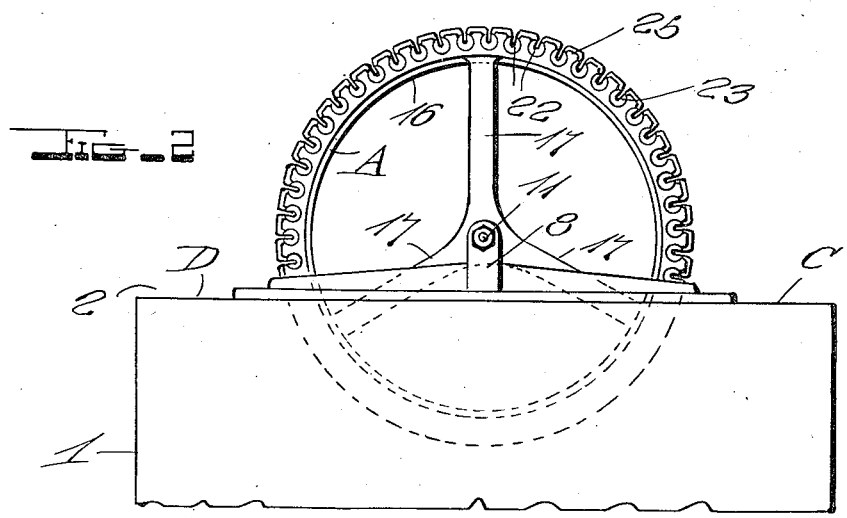
Fig. 2 is an end elevation thereof.

Referring now more particularly to the drawings, 1 designates a suitable supporting base or frame carrying a table 2 having formed therein a rectangular opening 3 bounded by a drum charging frame 4 suitably secured to the table. This frame includes parallel end and intermediate rails 5, 6 and 7 carrying bearing pedestals 8, 9 and 10. Mounted in threaded openings in the pedestals 8 and 9 are threaded bearing pins 11 and 12 having conoidal inner bearing ends 13, and slidably fitted in an opening in the pedestal 10 and clamped therein by a set screw 14' is a bearing pin 14 having conoidal bearing ends 15, said bearing pins 11, 12 and 14 being arranged horizontally in axial alinement. Jam nuts 11', 12' are provided to hold the pins 11, 12 in adjusted position and the binding screw 14' clamps the pin 14 in place.

Arranged to rotate in the opening 3 and in the spaces between the rails 5, 6 and 7 is a pair of rotary molding drums A and B. These drums are disposed side by side or in parallel relationship and said drums are similar in construction to each other, each drum comprising an annular rim portion 16 connected by spokes or arms 17 to a hub 17' which is coextensive in length with the width of the rim portion. Each drum hub is bored to receive an axle spindle 18 and each axle spindle is provided with threaded end portions 19 projecting beyond the ends of the hub in which it is fitted and formed with conoidal bearing recesses or sockets 20. On such threaded ends of the spindle are fitted clamping nuts 21 which engage the ends of the hub to clamp the spindle in position and against displacement. The conoidal ends 13 of the pins 11 and 12 engage the recesses 20 in the ends of the axle spindles 18 at the relatively outer ends of the drums, while the conoidal ends 15 of the pin 14 engage the recesses 20 in the ends of the spindles 18 at the relatively inner ends of the drums, whereby the drums are mounted to rotate.

It will be evident from the foregoing that the bearing pins 11, 12 and 14 are removable for ready replacement when worn and that pins 11 and 12 are adjustable to take up wear between the bearing surfaces whenever required and to adapt the drums to rotate as easily as desired or against any frictional opposition desired. The spindles 18 are also rapidly removable when desired for replacement by others when their bearing recesses become unduly worn, but, as hard metal spindles may be employed, and as wear as it occurs may be taken up by adjustment of the pins, long wear of the bearing parts is ensured and the drums may be readily maintained in proper working relationship and wobbling of the drums at any time effectually prevented.

The rim of each drum is provided with an annular series of transverse mold channels or cavities 22 in which the bunches are shaped and set. Each channel extends continuously from end to end of the rim and is cross sectionally of generally circular form or other desired form to give the intended shape to the body of the bunch or filler. Extending radially inward from the periphery of the rim and intersecting each channel is a slot 23 which is coextensive in length with the channel but is of less width than the channel at its point of major diameter. Through these slots the bunches to be shaped and set are introduced by the bunch breaker into the channels, the bunches so introduced expanding to fill and conform to the shape of the channels and set to form fillers of the intended cigar shape.

Secured to the opposite end faces of the rim of each drum are ring shaped plates 24 and 25, respectively, said plates having openings for passage of screws 26 and 27 whereby they are detachably fastened in position on the drum. In the double drum type of apparatus herein shown the plates 24 are applied to the relatively inner end faces of the drums A and B, while the plates 25 are applied to the relatively outer end faces of said drums. Each ring plate 24 is formed in its inner face with mold recesses 28 equal in number to and arranged in alinement with the mold channels 22, said recesses 28 being designed to impart a desired shape to the tuck ends of the bunches. Communicating with each of these recesses 28 is an opening 29 formed in the outer wall of the recess in axial alinement with the recess and the channel 22 with which it communicates. Each recess 28 also communicates with a slot 30 extending radially therefrom and through the outer periphery of the ring 24 and located in line with the slot 23 opening into the associated channel 22. Each ring plate 25 is provided with channels 31 and slots 32 conforming in shape to and alining with the channels 22 and slots 23 in the rim 16. The tuck forming ring plates 24 are made detachable so that tuck plates having forming recesses of different shapes may be interchangeably used to form the bunches with any desired shape of head or tuck. The ring plates 25 serve as extension plates and are made detachable so that extension plates of different thicknesses may be interchangeably used at the flag ends of the drums to vary the length of the mold channels so that bunches or fillers for cigars of different lengths may be shaped in the channels. Plates 25 of a certain thickness are shown applied to the drums. Extension plates 25a and 25b of different thicknesses from each other and from the plates 25 are shown in Figs. 9 and 10 as examples of interchangeable extension plates which may be used and, of course, any number of extension plates of different thicknesses may be supplied to the user of the drum to render the drum capable of molding cigar bunches of any conventional or desired cigar length.

In practice two drums arranged side by side are preferably employed in an organized apparatus, for the reason that the bunch breaker or operator who fills the molds can do that work twice as fast as the roller or operator who applies the wrappers can remove the bunches from the mold channels and roll them into cigars. In other words, a bunch breaker working at the front or charging side C of the table 2 can fill two mold channels while two rollers working at the opposite or delivery side D of the table 2 can remove two bunches from the channels and roll them into cigars. With the arrangement shown, therefore, a bunch breaker seated at the side C of the table can fill a mold channel in each drum A, B in receiving position or facing such side of the table while two rollers seated side by side at the side D of the table remove from channels of the drums at that side two formed bunches and apply the wrappers thereto. The drums are thus so arranged that one bunch breaker may feed two drums while a roller, one for each drum, removes the shaped and set bunch from the drum in front of him as it comes into receiving position and applies the wrapper thereto, thus enabling the work to be apportioned to a working group consisting of one bunch breaker and two rollers to the best advantage and to secure economy of time and labor and the manufacture of a maximum number of cigars within a given period of time. The positioning of the tuck end forming rings 24 at the relatively inner ends of the drums further allows right and left hand rolling operations to be made, that is to say, one roller may make a right hand wind and the other a left hand wind, adapting these operations to be more conveniently performed.

Each mold channel 22 is filled by introducing a tobacco bunch thereinto through the slots 23, 30, 32, the slot 30 allowing the tobacco and overlap of the binder at the tuck end to be jammed into the recess 28 to cause it to fill and conform to the contour of the recess. The entered bunch will then expand in the channel and assume the intended cigar shape without the application of pressure thereto. The bunch or filler so shaped will set with greater facility than one pressed to shape, as it will be more uniformly packed or be of more uniform density and will allow freer air ventilation promoting quick setting. The set is governed by the time period the bunch remains in the forming channel and the air condition in the workroom. If the air is dry the bunches will set quickly. If the air is moist a longer period will be required. The size of each drum and number of channels therein, which may be fifty or more, are so calculated with respect to the time periods required to fill the channels, that ordinarily, under certain atmospheric conditions, the bunches will be set during the time period between the charging of a channel by the bunch breaker at his stated work position and the movement of the channel into delivery position at the work point of the roller. The time allowed for setting, however, may be determined and regulated by the number of bunches placed in the mold channels before the roller is allowed to start extracting and rolling bunches. It will be understood, of course, that the bunches are extracted by sliding them longitudinally from the channels 22 through the channels 31 of the ring 25. This may be effected by inserting a suitable push tool through the opening 29 in line with a channel 22 and forcing the bunch out of the channel in the manner described. The tool may be of a form having a head to engage the tuck end of the bunch and a shank to slide in the slots 30, 23 and 32. The direction in which the bunches are slidably extracted from each drum obviously allows this to be done without interference from the other drum.

From the foregoing description, taken in connection with the drawings, the construction and mode of operation of my improved cigar bunch or filler molding apparatus will be readily understood without a further and extended description and it will be seen that the invention provides an apparatus of this character which simplifies the bunch shaping actions and enables a greater number of bunches to be shaped and rolled within a given period of time. While the structure shown for purposes of exemplification is preferred, it will, of course, be understood that changes in the construction, form and arrangement of parts may be made within the scope of the appended claim without departing from the spirit or sacrificing any of the advantages of the invention.

What I claim is:

A cigar making mold comprising a rotary drum having a series of bunch shaping channels extending across the drum from end to end thereof and spaced from each other circumferentially thereof and a longitudinal introduction slot communicating with each channel, the introduction slots being of less width than the channels and constituting constricted entrance throats, circular members at opposite ends of said drum, screws passed through said members and into threaded sockets in ends of the drum to detachably hold said members in place against ends of the drum, one circular member being formed with circumferentially spaced openings adjacent its periphery registering with ends of said channels and slots registering with the introduction slots and opening through the periphery of the member, the circular members at the other end of the drum being formed with tuck molding recesses and introduction slots registering with the channels and slots for the drum, the tuck forming recesses being tapered outwardly and at their outer ends terminating in small openings at their centers for insertion of an element for shifting bunches longitudinally and discharging bunches through the openings of the first circular member.

EDWARD WOOD BERRIMAN.